United States Patent [19]

Mäder et al.

[11] Patent Number: 5,765,979
[45] Date of Patent: Jun. 16, 1998

[54] IMPACT-TYPE ANCHOR

[75] Inventors: Eberhard Mäder, Eutingen-Göttelfingen; Rainer Mallée, Waldachtal; Jürgen Striebich, Horbo; Gerd Schedler, Waldachtal, all of Germany

[73] Assignee: fischerwerke, Artur Fischer GmbH & Co. KG, Waldachtal, Germany

[21] Appl. No.: 693,884

[22] Filed: Aug. 5, 1996

[30] Foreign Application Priority Data

Aug. 4, 1995 [DE] Germany ............... 195 28 675.8

[51] Int. Cl.$^6$ ........................................... F16B 13/06
[52] U.S. Cl. ........................................ 411/61; 411/57
[58] Field of Search ........................... 411/61, 60, 55, 411/57, 63–66

[56] References Cited

U.S. PATENT DOCUMENTS

| | | | |
|---|---|---|---|
| 1,372,035 | 3/1921 | Ogden | 411/61 |
| 1,601,796 | 10/1926 | Gordon | 411/61 |
| 1,821,401 | 9/1931 | Peirce | 411/61 |
| 2,784,636 | 3/1957 | Bohmer | 411/61 |
| 3,747,468 | 7/1973 | Jansen | 411/61 |
| 4,002,100 | 1/1977 | Bucheli | 411/61 |
| 4,642,008 | 2/1987 | Herb | 411/61 |
| 4,673,321 | 6/1987 | Herb | 411/40 |
| 4,765,788 | 8/1988 | Nowak | 411/61 |
| 4,893,973 | 1/1990 | Herb | 411/61 |
| 4,904,135 | 2/1990 | Barthomeuf | 411/61 |

FOREIGN PATENT DOCUMENTS

| | | |
|---|---|---|
| 7424831 | 1/1976 | Germany. |
| 76 36 399 | 3/1977 | Germany. |
| 76 12 316 | 2/1978 | Germany. |

*Primary Examiner*—Steven N. Meyers
*Assistant Examiner*—Gary Estremsky
*Attorney, Agent, or Firm*—Michael J. Striker

[57] ABSTRACT

The impact-type anchor (1) consists of a metal sleeve (2) provided with a throughgoing passage (3) tapering towards a leading end of the sleeve, into which bore an expander body (5) can be driven to expand the impact-type anchor. The throughgoing passage (3) has a rear cylindrical portion provided with an internal thread (4) as well as a tapering portion. So that the metal sleeve can be inexpensively manufactured while providing pull-out values that are the same as those of a metal sleeve made of solid material, the metal sleeve is stamped out of a sheet metal blank and then rolled up to form a sleeve which is joined at its seam. Furthermore, in order to form the tapering internal bore the expandable legs (7) have a first section (7a) that is bent inwards and a second section (7b) that is bent onto the outer face of the first section. The two sections (7a, 7b) resting one against the other are connected non-displaceably to one another, for example, by means of a punched point (9).

6 Claims, 1 Drawing Sheet

IMPACT-TYPE ANCHOR

BACKGROUND OF THE INVENTION

The invention relates to an impact-type anchor, consisting of a partially slit metal sleeve and an expander body that can be driven into the metal sleeve.

An impact-type anchor is known consisting of a metal sleeve that has an internal thread for a screwing and is partially slit to form expansible legs. The metal sleeve is provided with a throughgoing passage that is at first cylindrical and then, in the region of the portion provided for expansion, tapers towards the leading end of the sleeve, into which passage an expander body can be driven to expand the impact-type anchor. The metal sleeve is stamped out of a sheet metal blank and then rolled up to form the sleeve joined at its seam.

The known impact-type anchors of the above-mentioned type (as described in the German Patent Documents DE-U 76 12 316 and DE-U 76 36 399) are generally made of a solid material within which an internal thread is provided, the central bore of which thread tapers conically towards the leading end. Inserted into that central bore is an expander body that is driven into the narrowing bore using a drive-in tool in order to expand the impact-type anchor. In the region of the narrowing bore the impact-type anchor has longitudinal slits to form expansible legs. The known impact-type anchors are usually made of solid material, the bore with the internal thread and the slits being produced by a machining process. There have also been attempts to construct the impact-type anchor in such a manner that it is possible to manufacture it using a stamping/bending process.

This kind of impact-type anchor is known, for example, from German Patent Document DE-U 74 24 831. In that impact-type anchor the tapering internal bore is formed by indentations that are so arranged that, in the inner faces of the expansible shells resulting from the longitudinal slitting, transverse ribs occur spaced from one another. The height of the transverse ribs increases from rib to rib towards the insertion end. In the case of comparatively large expanding pressure forces, however, the indentations are deformed so that the expanding forces applied by the expander body are not converted into corresponding holding forces of the impact-type anchor. The known impact-type anchor is therefore not suitable for anchoring in highly rigid materials, such as, for example, concrete.

SUMMARY OF THE INVENTION

It is an object of the present invention to provide an impact-type anchor of the above-described kind which can be manufactured inexpensively using a process not involving machining, but nevertheless has large pull-out values compared to those of an impact-type anchor manufactured from solid material.

These objects and others which will become more apparent hereinafter are attained in an impact-type anchor consisting of a metal sleeve that has an internal thread for a screwing, is partially slit to form expansible legs and is provided with a throughgoing passage that is, at first, cylindrical and then, in the region of the portion provided for expansion, tapers towards the leading end, into which passage an expander body can be driven to expand the impact-type anchor. The metal sleeve is stamped out of a sheet metal blank and then rolled up to form the sleeve joined at its seam.

According to the invention, the expansible legs have a first section that is bent inwards and an adjacent second section which is bent around onto the outer face of the first section, and the two sections resting one against the other have a shear-resistant connection to one another.

To manufacture the impact-type anchor, first the outline of the developed form of the metal sleeve is stamped out of a metal strip in a stamping and bending tool, the two sections that form each expansible leg initially being contiguous with one another in the axial direction. In further steps of the method the turns of the thread are stamped in and the second section of the expansible leg is bent up against the first section in the bending tool. To connect the two sections to one another nondisplaceably, for example, a punched point can extend from the outer face of the second section. This punched point presses into the outer face of the first section. The sheet metal blank is then rolled up to form the metal sleeve and is optionally joined at the seam using a tongue connection. Adjustment of the expansible legs having a double wall thickness to a continuously uniform diameter necessarily gives rise to a bending inwards of the first section of the expansible legs resulting in a narrowing internal bore. An expander body can then be driven into that narrowing internal bore to expand the impact-type anchor. The thickened region of the expansible legs that is formed as a result of the two sections resting one against the other allows a degree of expansion that corresponds to twice the thickness of the wall of the sleeve.

To convert that degree of expansion into pullout force, it is necessary according to the invention for the two sections resting one against the other to be connected to one another non-displaceably. Without such a connection the folded-over second section of the expansible leg would be sheared off from the first section at the bend even at a low tractive force that would as such be obtainable as a result of an expansion by twice the wall thickness of the expansible legs. As a result of the non-displaceable connection of the two sections, for example by way of a punched point, spot weld or by toothing that is formed by transverse ribs, the shearing force acting on the bend is reduced. The pull-out force can thus be increased considerably before shearing off occurs and accordingly the holding force of the plug can be increased. With the impact-type anchor according to the invention, the same holding values are obtainable as in the case of impact-type anchors made from solid material. The manufacturing costs, however, are considerably less as a result of the non-machining production in a stamping and bending tool.

To obtain a uniformly tapering internal bore, it is advantageous to provide the inner face of the second section that rests against the first section with a chamfer that corresponds to the angle through which the first section is bent inwards.

The angle ($\alpha$) through which the first section (7a) bends inwards is advantageously from 5° to 7°.

The subject matter of the patent document, German Patent Application 195 28 675.8, on which priority of the claims of the instant invention is based is hereby included by reference.

BRIEF DESCRIPTION OF THE DRAWING

The objects, features and advantages of the invention are now made more apparent from the following detailed description, with reference to the accompanying drawing in which.

DESCRIPTION OF THE PREFERRED EMBODIMENTS

Figure 1:
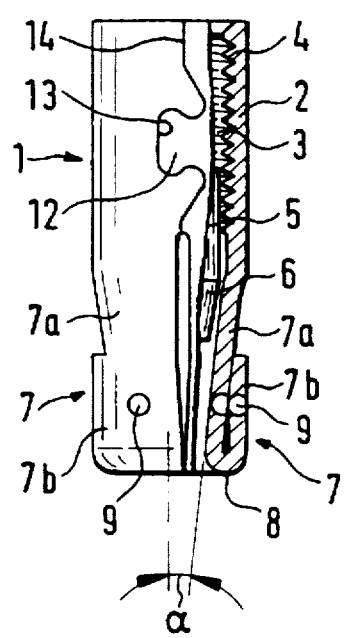
FIG. 1 is a cutaway cross-sectional view through one embodiment of an impact-type anchor with an inserted expander pin according to the invention.

The impact-type anchor 1 illustrated in FIG. 1 consists of a metal sleeve 2 provided with a throughgoing passage 3. The passage 3 is, at first, cylindrical and then in the region of the portion of the metal sleeve 2 provided for expansion tapers conically towards the leading end of the metal sleeve 2. An internal thread 4 is provided in the rear region of the throughgoing passage 3 opposite the leading end of the sleeve.

An expander body 5 is inserted in the throughgoing passage 3, which expander body has a cylindrical section and, adjoining the latter, a truncated cone 6 that tapers towards its leading end. The tapering of the throughgoing passage 3 after or following the internal thread 4 is achieved by the fact that the expansible legs 7 are bent inwards, the inner faces of the expansible legs forming an angle of inward bend α of from 5° to 70° towards the central axis of the impact-type anchor. A second section 7b of the expansible legs 7 is folded over onto the outer face of the first section 7a in such a manner that, after the folding over, the outer face of the second section 7b has approximately the same outer diameter as the impact-type anchor has in the region of the internal thread. As a result of the folding over, an expansible region is formed that corresponds to twice the wall thickness of the sleeve 2. To prevent the two sections 7a, 7b from shearing off at the bend 8 in the case of comparatively large pull-out forces, the two sections are connected to one another by means of a punched point 9 to be shear resistant.

Figure 2:
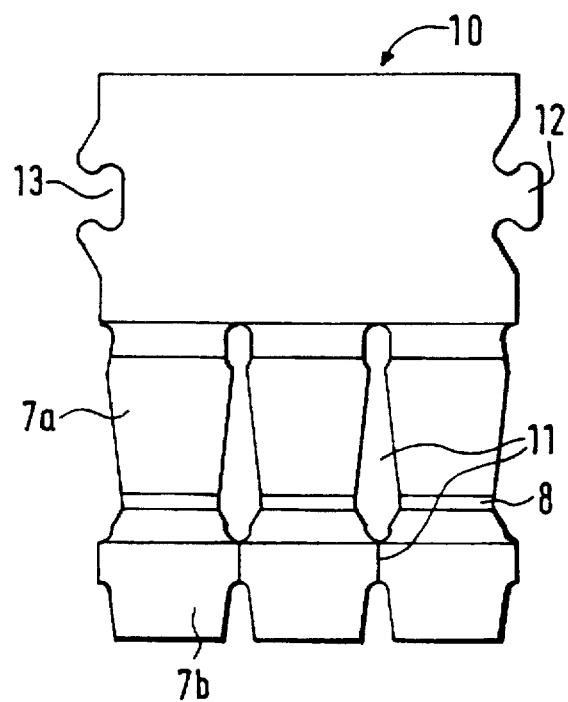
FIG. 2 is an outline of a stamping from a metal plate used for making the impact-type anchor according to the invention.

The metal sleeve 2 is manufactured in a stamping and bending tool in which first the outline 10 of the stamping illustrated in FIG. 2 is stamped out. The section 7b is then folded over at the bend 8 onto the outer face of section 7a to form the expansible leg 7. The sections 7a, 7b are separated from one another by a slit 11. At the same time the section 7a is given a slightly conical profile to enable the section 7a to be bent inwards through the angle α as the blank is subsequently rolled up to form the sleeve 2. On being rolled up, the sleeve 2 is joined at the seam 14 by the tongue 12 arranged on one longitudinal edge and the recess 13 arranged on the other longitudinal side. As a result of the two slits 11 and the seam 14, in the embodiment illustrated three expansible legs are formed after the rolling up.

The internal thread 4 can either be cut after the rolling up or can be produced by stamping in the turns of the thread in the stamping and bending tool. The punched point 9 can also be made either after rolling up the sleeve or even after folding together the two sections 7a, 7b.

Figure 3:
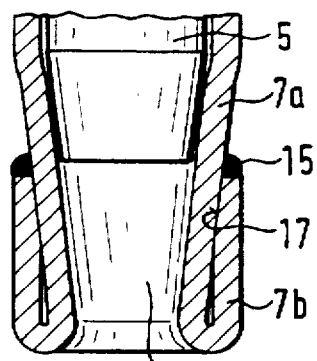
FIG. 3 is a cutaway cross-sectional view through an impact-anchor showing the connection of two sections of the expansible leg by means of a spot weld.
Figure 4:
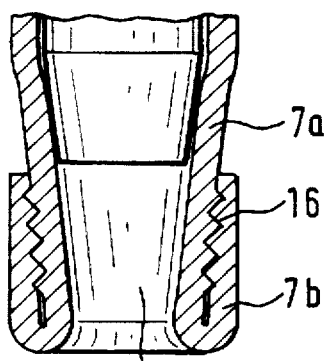
FIG. 4 is a cutaway cross-sectional view through another embodiment of the impact-anchor showing the connection of the two sections of the expansible leg by means of toothing that is formed by transverse ribs.

FIG. 3 shows an alternative embodiment in which the shear-resistant connection between sections 7a and 7b is obtained by means of a spot weld 15. In FIG. 4 the shear-resistant connection is effected by means of toothing that is formed by transverse ribs 16 on the outer face of section 7a and on the folded-over inner face of section 7b, which transverse ribs 16 engage with one another. In order to obtain uniform tapering of the bore 3 in the region of the expansible legs, the inner face of the folded-over section 7b has a chamfer 17 that corresponds to the angle of inward bend α.

What is claimed is:

1. An impact-type anchor, consisting of a metal sleeve having an internal thread for a screw, said metal sleeve being partially slit to form expandable legs and provided with a throughgoing passage having a cylindrical portion and a tapering portion provided for expansion, said tapering portion tapering toward a leading end of the metal sleeve and said internal thread being located in said cylindrical portion of said throughgoing passage, said throughgoing passage being formed so that an expander body can be driven into said passage to expand the metal sleeve and the metal sleeve being stamped out of a sheet metal blank and then rolled up to form said metal sleeve joined with a seam;

wherein the expandable legs (7) comprise an inwardly bent first section (7a) having an outer face and a second section (7b) having an inner face, said second section (7b) being bent so that the inner face of the second section rests on the outer face of the first section (7a), and the two sections (7a, 7b) that rest one against the other have a shear-resistant connection means for resisting axial shear of the second section relative to the first section resulting from pull out forces.

2. The impact-type anchor according to claim 1, wherein the shear-resistant connection means comprises two sections (7a, 7b) of the expansible legs (7) being connected to one another by a punched point connection (9).

3. The impact-type anchor according to claim 1, wherein the shear-resistant connection means comprises two sections (7a, 7b) of the expansible legs (7) being connected to one another by means of a spot weld (15).

4. The impact-type anchor according to claim 1, wherein the shear-resistant connection means comprises two sections (7a, 7b) of the expansible legs (7) being connected to one another by means of toothing, said toothing being formed by transverse ribs (16) provided on both of the sections (7a,7b) so that said sections engage with one another via said toothing.

5. The impact-type anchor according to claim 1, wherein the inner face of the second section (7b) resting against the outer face of the first section (7a) is provided with a chamfer (17) corresponding approximately to an angle (α) through which the first section (7a) bends inwards.

6. The impact-type anchor according to claim 1, wherein the first section (7a) bends inwards at an angle α of from 5° to 7°.

* * * * *